(12) United States Patent
Johnson

(10) Patent No.: US 8,302,796 B1
(45) Date of Patent: Nov. 6, 2012

(54) UTILITY BOX ANTI-THEFT LOCK BRACKETS

(75) Inventor: Clarence Johnson, Hercules, CA (US)

(73) Assignee: Loc-Ets, Inc., Fremont, CA (US)

( * ) Notice: Subject to any disclaimer, the term of this patent is extended or adjusted under 35 U.S.C. 154(b) by 904 days.

(21) Appl. No.: 12/365,058

(22) Filed: Feb. 3, 2009

Related U.S. Application Data

(60) Provisional application No. 61/063,660, filed on Feb. 4, 2008.

(51) Int. Cl.
*H02G 3/08* (2006.01)
*H02G 3/14* (2006.01)
*F16M 13/00* (2006.01)

(52) U.S. Cl. ............... 220/3.9; 174/66; 248/551

(58) Field of Classification Search ......... 220/3.2, 220/3.3, 3.8, 3.9, 324, 651–653, 484, 241–243, 220/314, 315, 284; 70/164, 77, 158, 163, 70/170, DIG. 34; 292/289, 291, 256, 256.5, 292/256.6, 256.71; 403/389; 248/551, 70, 248/500, 225.21; 174/50, 66; 411/400, 401

See application file for complete search history.

(56) References Cited

U.S. PATENT DOCUMENTS

| | | | | |
|---|---|---|---|---|
| 2,503,910 A * | 4/1950 | Kerby | ............... | 4/636 |
| 3,494,651 A * | 2/1970 | Fork et al. | ............ | 292/256 |
| 4,306,109 A * | 12/1981 | Nattel | ............... | 174/51 |
| 4,349,361 A * | 9/1982 | Scott et al. | ............ | 55/357 |
| 5,197,307 A * | 3/1993 | Abbott, Jr. | ............ | 70/164 |
| 7,758,011 B2 * | 7/2010 | Haddock | ............ | 248/500 |
| 2008/0207047 A1 * | 8/2008 | Walton | ............ | 439/538 |

* cited by examiner

*Primary Examiner* — Bryon Gehman
*Assistant Examiner* — Shawn Braden
(74) *Attorney, Agent, or Firm* — Peters Verny, LLP

(57) ABSTRACT

Anti-theft devices are provided for use with both new and previously installed utility boxes. The utility box includes a sidewall, typically set into the ground, and the anti-theft device includes a bracket that hooks beneath the sidewall. The bracket also includes a threaded bore disposed through a fastening piece. The utility box also includes a cover that seals a top opening of the sidewall. The cover includes a hole for receiving a bolt. The threaded bore aligns with the hole in the cover so a bolt can engage the threaded bore to secure the cover to the bracket.

18 Claims, 8 Drawing Sheets

UTILITY BOX ANTI-THEFT LOCK BRACKETS

CROSS-REFERENCE TO RELATED APPLICATIONS

This application claims the benefit of, and incorporates by reference, U.S. Provisional Patent Application No. 61/063,660 filed on Feb. 4, 2008 and also titled "Utility Box Anti-Theft Lock Brackets."

BACKGROUND OF THE INVENTION

1. Field of the Invention

The invention relates generally to the field of utility enclosures, and more particularly to anti-theft devices for in-ground utility boxes.

2. Description of the Prior Art

The theft of copper and other metals has become a growing problem with the increase in scrap metal prices. Thieves typically target sources of metal that are both easy to access and that are located in low visibility areas. One increasingly common target are utility boxes that are set into the ground. Frequently, these utility boxes are unlocked or otherwise unsecured and one need only lift the cover off to have access to the contents. Although some new utility boxes include locking mechanisms, there exists a very large number of existing unsecured utility boxes already in service that are susceptible to easy break-in.

Accordingly, there is a need to be able to secure existing utility boxes against break-in.

SUMMARY

An exemplary anti-theft device for a utility box comprises first and second legs each attached at a top end to a fastening piece. The fastening piece includes a threaded bore that defines a bore axis. Each of the two legs defines a longitudinal axis, where both longitudinal axes are parallel to the bore axis. Each leg also includes a foot extending perpendicular to the longitudinal axis from a bottom end of the leg, and the two feet are disposed perpendicular to one another. In various embodiments the fastening piece comprises a nut or a plate. Each leg, in some embodiments, further includes a cross member that comprises the top end of the leg that is attached to the fastening piece.

In various embodiments, a leg and corresponding foot comprise a metal rod having a right-angle bend. In some of these embodiments, both legs and feet comprise metal rods each having a right-angle bend, and in further of these embodiments the two rods are integral, in other words, the two legs and feet comprise a single rod.

In still further embodiments, one foot of the anti-theft device defines a horizontal axis. The foot includes a first end attached to the leg and a toe extending from the second end in a direction that is perpendicular to the horizontal axis. In some of these embodiments the direction that is perpendicular to the horizontal axis is also parallel to the longitudinal axis defined by the leg. Also in some of these embodiments a length of the foot between the toe and the leg exceeds the width of a sidewall of a utility pull box.

The anti-theft device, in various embodiments, further comprises a bolt configured to engage the threaded bore of the fastening piece. In some instances, the bolt includes a non-standard head so that commonly available drivers cannot be used to remove the bolt. An exemplary non-standard head includes a recess to receive a key, and the recess includes a central pin.

The anti-theft device, in various embodiments, can also comprise additional features for stabilizing the anti-theft device during the installation process. For example, the anti-theft device can further comprise a ground plate attached beneath the feet of the two legs. Similarly, the anti-theft device can further comprise a third leg defining a longitudinal axis that is parallel to the bore axis and the other two longitudinal axes defined by the other two legs. The third leg creates a tripod for stability. The anti-theft device can further comprise a spacer to keep the anti-theft device a proper distance from a sidewall of the utility box. The anti-theft device can further comprise a conical bore disposed above the threaded bore and aligned with the bore axis to help guide a bolt into the threaded bore.

The present invention also provides a utility box anti-theft device comprising first and second brackets and a stabilization bar joining the first and second brackets. In some embodiments, the stabilization bar is detachable from the first and second brackets. Each bracket of the anti-theft device includes a fastening piece including a threaded bore defining a bore axis. Each bracket also includes a first leg and a second leg. The first leg defines a first longitudinal axis parallel to the bore axis. The first leg includes a top end attached to the fastening piece, and a first foot extending perpendicular to the first longitudinal axis from a bottom end thereof. The second leg defines a second longitudinal axis which is also parallel to the bore axis. The second leg also includes a top end attached to the fastening piece. The second leg further includes a second foot extending perpendicular to the second longitudinal axis from a bottom end thereof and also disposed perpendicular to the first foot.

The present invention also provides a utility box comprising a sidewall, a cover, a bracket, and a bolt. The sidewall defines an enclosure having opposing top and bottom openings at either end. The sidewall also includes an inner surface, opposing top and bottom surfaces, and an inner lip disposed within the enclosure and recessed below the top surface. The cover is disposed within the top opening and is supported by the inner lip. The cover includes a hole, disposed proximate to a corner of the cover, and disposed through a thickness of the cover. The bracket is engaged beneath the sidewall of the utility box. The bracket includes a fastening piece having a threaded bore defining a bore axis. The bolt is disposed through the hole in the cover and engages the threaded bore to secure the cover to the bracket. In various embodiments, the bracket can include one or both of the legs described above. In various embodiments, the fastening piece comprises a nut that includes the threaded bore. In these embodiments, a plate having an aperture aligned with the threaded bore is attached to the nut. In some of these embodiments the aperture through the plate comprises a conical bore.

The present invention further provides methods for securing an installed utility box. An exemplary method comprises removing material from around a bottom surface of a sidewall of the utility box and installing a bracket within the utility box such that a leg extends beneath the sidewall where cleared of material. The method further comprises placing a cover within a top opening of the sidewall and securing the cover to the bracket. Removing material from around a bottom surface of the sidewall of the utility box can comprise digging beneath and around the sidewall proximate to a corner of the sidewall to remove dirt or gravel, for example. Installing a bracket within the utility box can comprise, for example, engaging a foot of a leg under the sidewall. Placing the cover within the top opening of the sidewall can comprise, in some embodiments, resting the cover on an inner lip of the sidewall. Securing the cover to the bracket can comprise inserting something threaded, like a bolt or a screw, through a hole in the cover that is aligned with a threaded bore of the bracket, and engaging the threaded thing with the threaded bore. In further embodiments, rather than remove material from around a bottom surface of the sidewall of the utility box, instead a portion of the sidewall is removed create a recess in the sidewall. In still additional embodiments, securing the cover to the bracket can comprise inserting a threaded rod into the threaded bore, inserting an end of the threaded rod through the hole in the cover, and then threading a nut onto the threaded rod, where in further embodiments the nut is a security nut designed to only engage with a non-standard driver.

DETAILED DESCRIPTION OF THE INVENTION

The present invention provides an anti-theft device for use with both new and previously installed utility boxes such as utility pull boxes. The utility box includes a sidewall, typically set into the ground, and the anti-theft device includes a bracket that hooks under the sidewall. The bracket also includes a threaded bore disposed through a plate, a nut, a flange, or the like. The utility box also includes a cover that seals a top opening of the sidewall. The cover also has a hole for receiving a bolt. The threaded bore can be aligned with the hole in the cover so that the bolt engages with the threaded bore, securing the cover to the bracket which is hooked under the sidewall. In some instances, retrofitting an installed utility box involves removing some material around the bottom of the utility box so that the bracket can be inserted under the sidewall. Various embodiments described herein are directed to different ways to stabilize the free-standing bracket before the cover is set into the top opening of the sidewall. Additional embodiments are directed to ways to make the anti-theft device more secure against break-ins.

Figure 1:
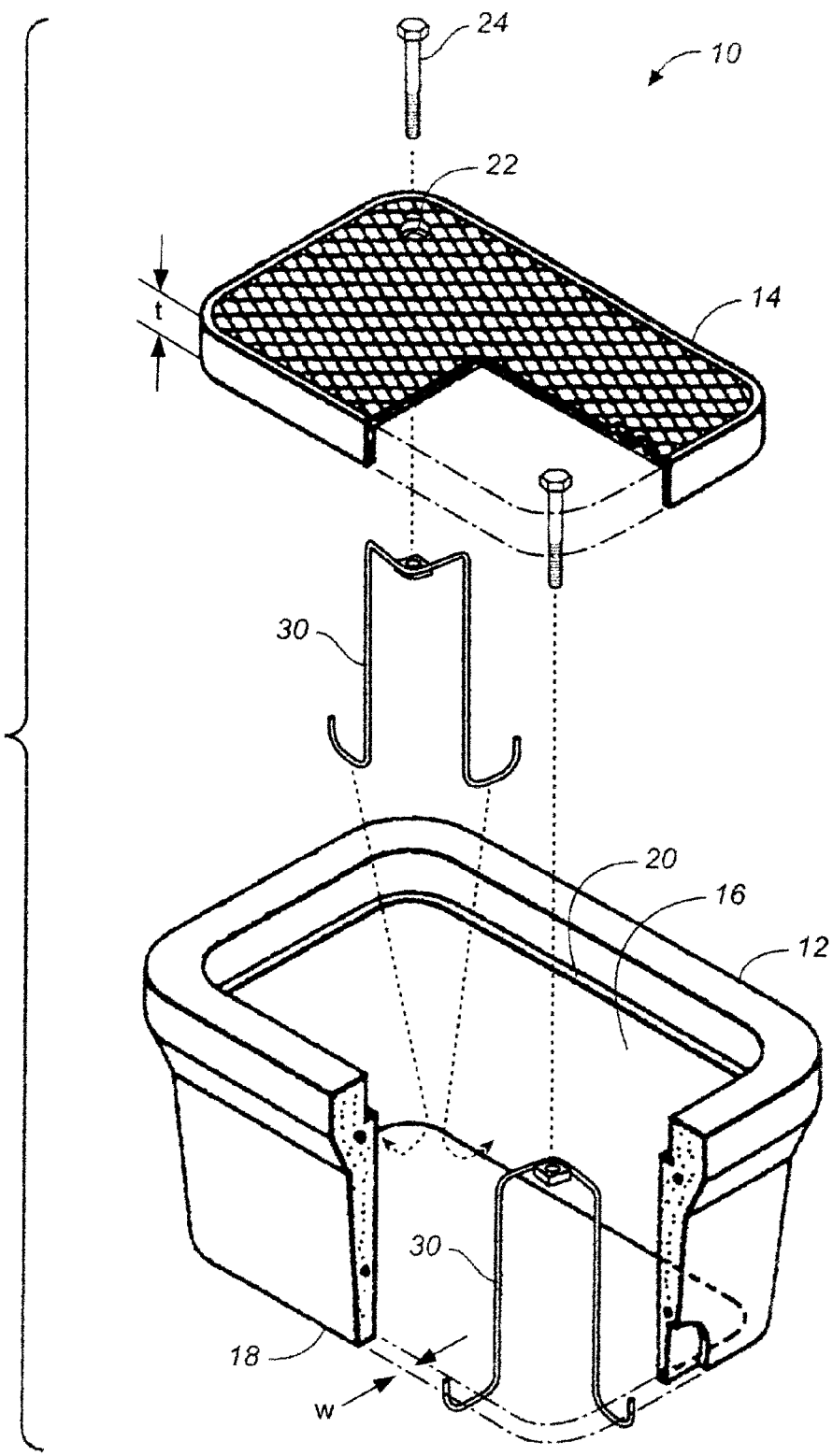
FIG. 1 provides an exploded view of a utility pull box with two anti-theft brackets according to an embodiment of the present invention.

FIG. 1 shows an exploded view, with a cut-away section, of a utility pull box 10 and two exemplary anti-theft brackets 30 of the invention. As used herein, a utility pull box 10 is defined as an enclosure comprising a sidewall 16 and an opening at either end. The shape of the cross-section of the enclosure, taken parallel to the top and bottom surfaces, may be any shape from circular to various irregular shapes. In some embodiments, the utility pull box 10 defines a square or rectangular enclosure, as illustrated in FIG. 1. The sidewall 16 can be made of any number of materials, but particularly those that perform well under cyclical compression and prolonged weathering. In exemplary embodiments, the utility pull box 10 is cast as a one-piece structure from concrete or a polymer concrete.

In use, the utility pull box 10 is disposed into the ground, sometimes through a layer of pavement or concrete, and a bottom opening of the utility pull box 10 remains open to that environment. Although the present invention is specifically described herein with reference to utility pull boxes 10, it will be appreciated that the invention can be used in conjunction with other enclosures including electric meter enclosures, traffic boxes, and power utility boxes.

The sidewall 16 of the utility pull box 10 includes a top surface 12 opposing a bottom surface 18. The sidewall 16, in some embodiments, tapers from the top surface 12 to the bottom surface 18, as can be seen from the cross-sectional view of the sidewall 16 at the cut-away section. The width, w, of the sidewall 16, as measured at the bottom surface 18, is about 10 inches in some embodiments. The sidewall 16 also includes an inner lip 20 recessed below the top surface 12 and extending inward from an inner surface of the sidewall 16.

The utility pull box 10 further comprises a cover 14 sized to fit within the top opening of the utility pull box 10. More specifically, when engaged with the sidewall 16, the cover 14 rests on the inner lip 20 and a top surface of the cover 14 is flush with the top surface 12 of the sidewall 16. Accordingly, the inner lip 20 is recessed below the top surface 12 by an amount approximately equal to a thickness, t, of the cover 14. The cover 14 also comprises a hole 22 through the thickness thereof. The hole 22 is disposed proximate to a corner of the cover 14. In some embodiments, the hole 22 is disposed about 2 inches from the corner of the cover 14. The hole 22 is sized to receive a bolt 24, discussed below, and in some embodiments the hole 22 is counter-sunk so that a head of the bolt 24 can fit within the hole 22. In those embodiments that employ two brackets 30, as does the illustrated embodiment of FIG. 1, the cover 14 includes two holes 22, each hole 22 disposed proximate to a diagonal corner of the cover 14. The cover 14, in some embodiments, is made of the same material as the sidewall 16, while in other embodiments the sidewall 16 and cover 14 are made of different materials.

Figure 2:
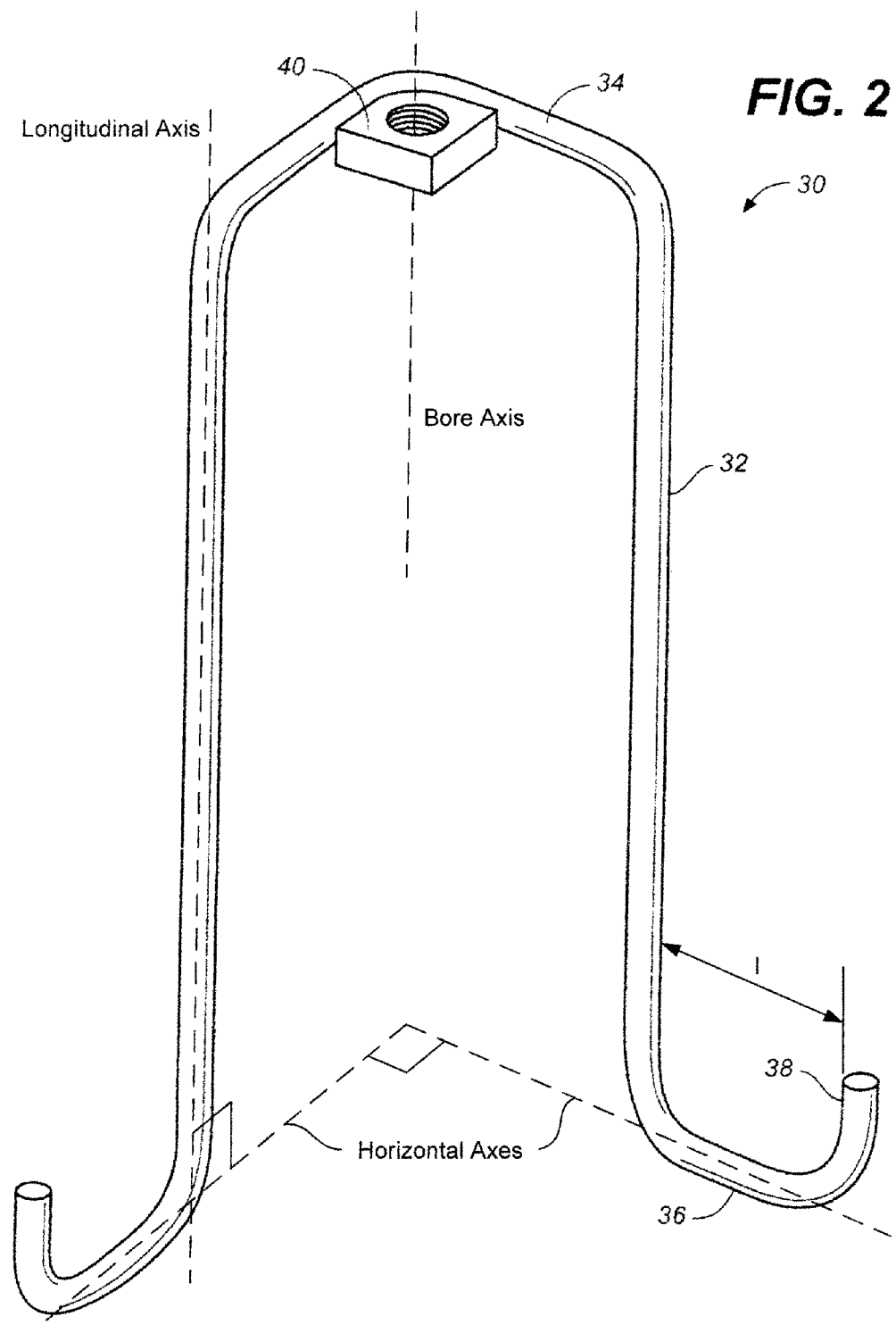
FIG. 2 is a perspective view of a bracket according to an embodiment of the invention.

FIG. 2 shows a perspective view of an exemplary bracket 30. The bracket 30 can be fabricated, for example, from a corrosion resistant material such as stainless steel. The bracket 30 comprises a fastening piece 40 including a threaded bore defining a bore axis. The fastening piece 40 can be a nut, for example, as in the drawing. The bracket 30 also comprises two legs 32 attached to the fastening piece 40, for example, by welds. It will be appreciated that although the bracket 30 includes two legs 32, as shown in FIGS. 1 and 2, a suitable bracket can be constructed from only one leg attached to the fastening piece 40. Each leg 32 defines a longitudinal axis that is parallel to the bore axis.

Each leg 32 defines a longitudinal axis that is parallel to the bore axis, and a length of each leg 32 is approximately equal to, or slightly shorter than, a height of the sidewall 16. Each leg 32 includes a top end attached to the fastening piece 40 and a foot 36 extending from a bottom end of the leg 32. In some embodiments, each leg 32 also includes a cross member 34 extending from the top end of the leg 32, and in these embodiments the fastening piece 40 is attached to the cross member 34.

Each foot 36 defines a horizontal axis, and the horizontal axis of each foot 36 is disposed in a direction perpendicular to the longitudinal axis of the respective leg 32. In those embodiments that include two legs 32, the horizontal axes defined by the respective feet 36 are disposed perpendicular to one another. From FIG. 2 it can be seen that the cross members 34 are disposed parallel to the horizontal axes defined by the respective feet 36. In further embodiments, each foot 36 includes a first end attached to the leg 32, and a toe 38 extending from a second end of the foot 36, and extending in a direction that is perpendicular to the horizontal axis. In some of these embodiments, the toe 38 also extends in a direction that is parallel to the longitudinal axis. In further embodiments, a length, l, of the foot 36 between the toe 38 and the leg 32 exceeds the width, w, of the sidewall 16 of the utility pull box 10. In some embodiments, only one of the two feet 36 includes the toe 38, while the other foot 3 does not, for easier retrofitting of existing utility pull boxes 10.

In the illustrated embodiment, each leg 32 is formed from a length of a metal rod, such as a stainless steel rod, that has been bent to define the cross member 34, foot 36, and toe 38. An exemplary diameter for the metal rod is 0.187 inches, although thinner and thicker diameters can also be used. Also in the illustrated embodiment, both legs 32 are integrally formed from the same metal rod. It will be appreciated that the legs 32 do not have to be formed from rods and in the alternative can be made from metal strips, for example.

Figure 3:
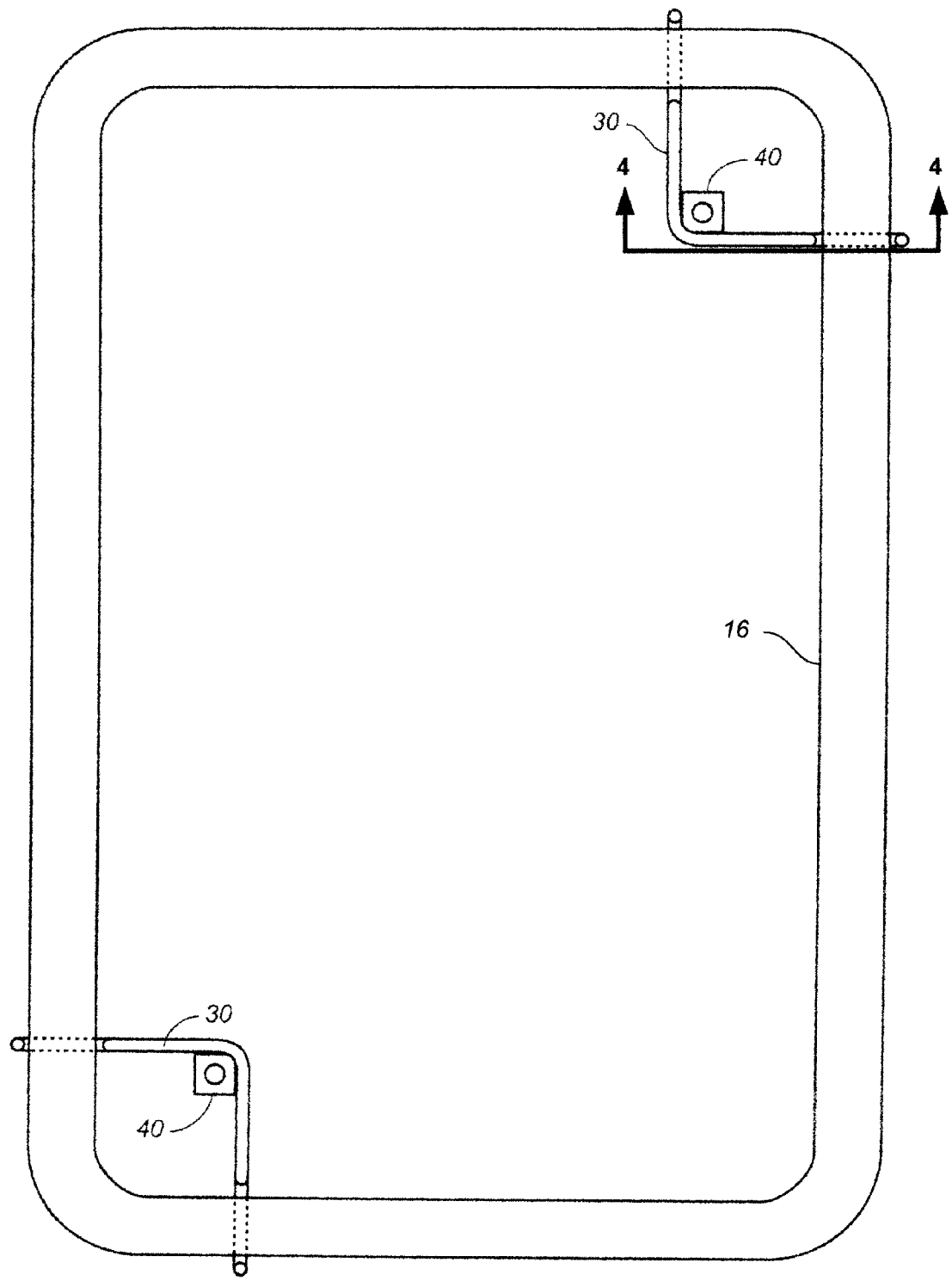
FIG. 3 shows a top view of the utility pull box of FIG. 1 with the cover omitted.
Figure 4:
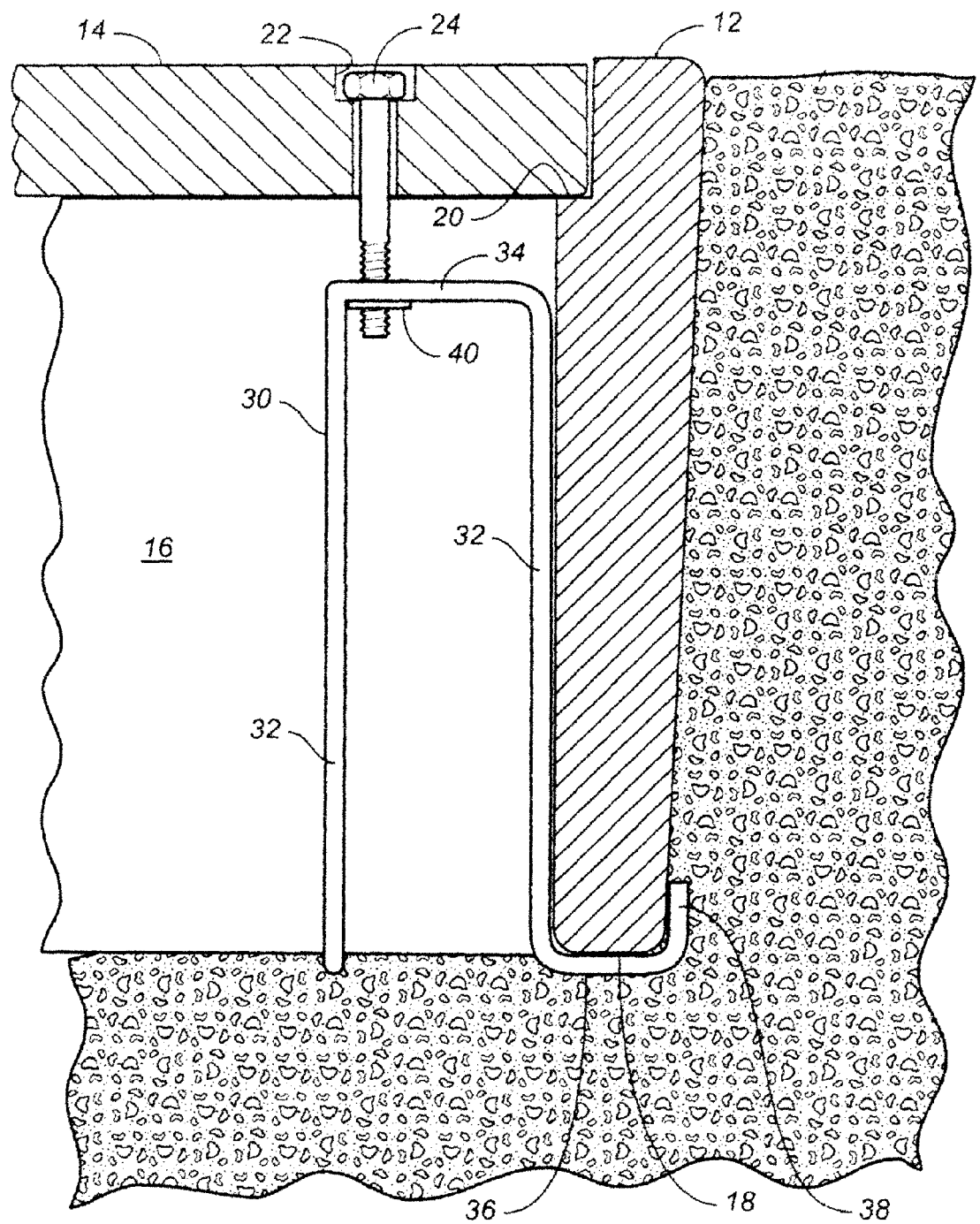
FIG. 4 shows a cross-sectional view of a portion of the utility pull box of FIG. 1, with the cover included.

In use, the bracket 30 is placed inside of the utility pull box 10 at a corner of the sidewall 16 such that the feet 36 extend under the bottom surface 18 as illustrated in a top view provided by FIG. 3. A cross-sectional view taken along the line 4-4 in FIG. 3 is also provided in FIG. 4. In those embodiments that include the toe 38, the lower portion of the leg 32 together with the foot 36 and toe 38 form a U-shaped segment that engages the sidewall 16. The cover 14 is placed on the sidewall 16 and the bolt 24 is inserted through the hole 22 to engage with the bore of the fastening piece 40. The bolt 24 serves to secure the cover 14 to the sidewall 16.

Figure 5:
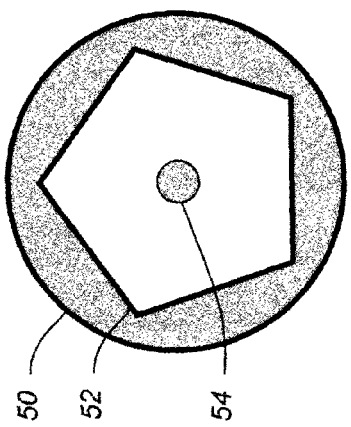
FIG. 5 is a top view of a non-standard bolt head according to an embodiment of the invention.

Having the head of the bolt 24 recessed into the cover 14, a shown, makes accessing the bolt 24 more difficult for would-be thieves. Security can be further enhanced through the use of bolts 24 with non-standard heads. A standard head is one that can be engaged by readily obtained drivers including hexagonal sockets, Phillips and slotted screwdrivers, and Allen wrenches. Non-standard heads exclude the following standard heads: slotted, Phillips, Pozidriv, square, Robertson, hex, hex socket, Torx, Tri-wing, Torq-set, spanner head, triple square, polydrive, one-way, splinedrive, double-hex, and Bristol. FIG. 5 illustrates an exemplary non-standard head 50. The head 50 comprises a pentagonal recess 52 and a circular pin 54 disposed at the center of the pentagonal recess 52. The head 50 can be engaged with a matching driver.

Figure 6:
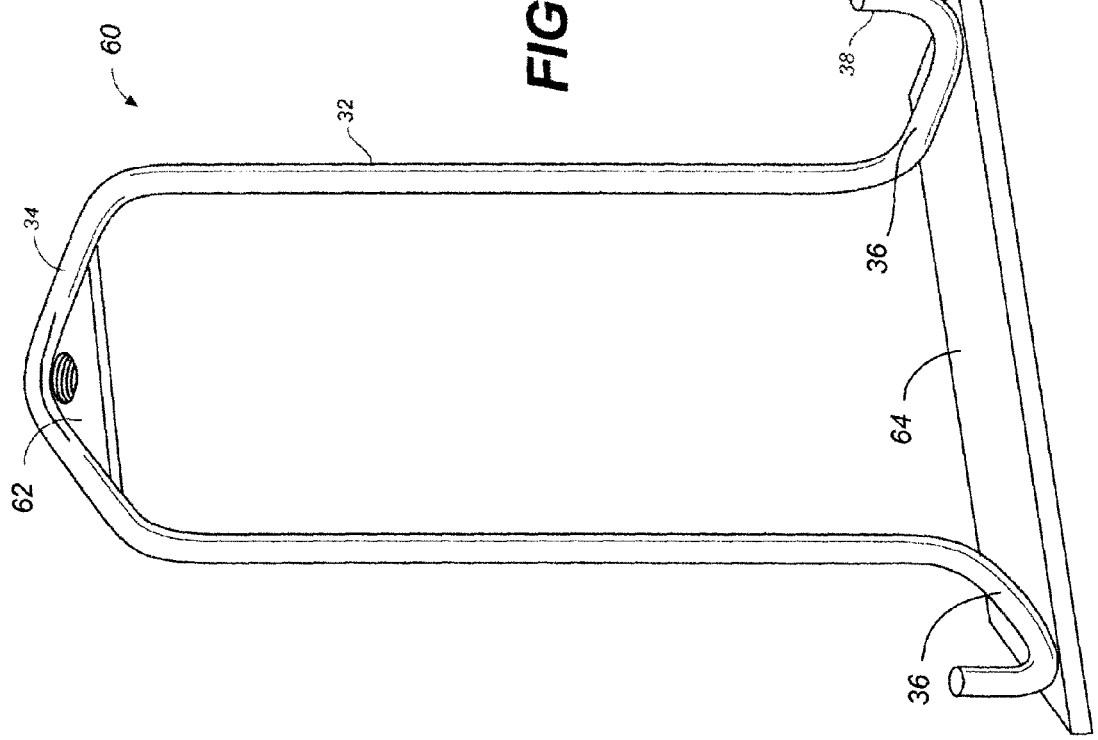
FIG. 6 is a perspective view of a bracket according to another embodiment of the invention.

FIG. 6 illustrates another embodiment of a bracket 60. In the illustrated embodiment, the fastening piece 40 comprises a plate 62 instead of the nut shown in FIG. 2. In further embodiments, the fastening piece 40 can comprise a flange. FIG. 6 also serves to illustrate a ground plate 64 which is an optional feature intended to impart stability to the free-standing bracket 30, 60 when resting on an uneven or soft surface during the installation process. The ground plate 64 can be attached beneath the feet 36, for example, with welds. The trapezoidal shape of the illustrated ground plate 64 is exemplary, and other shapes can also be implemented.

Figure 7:
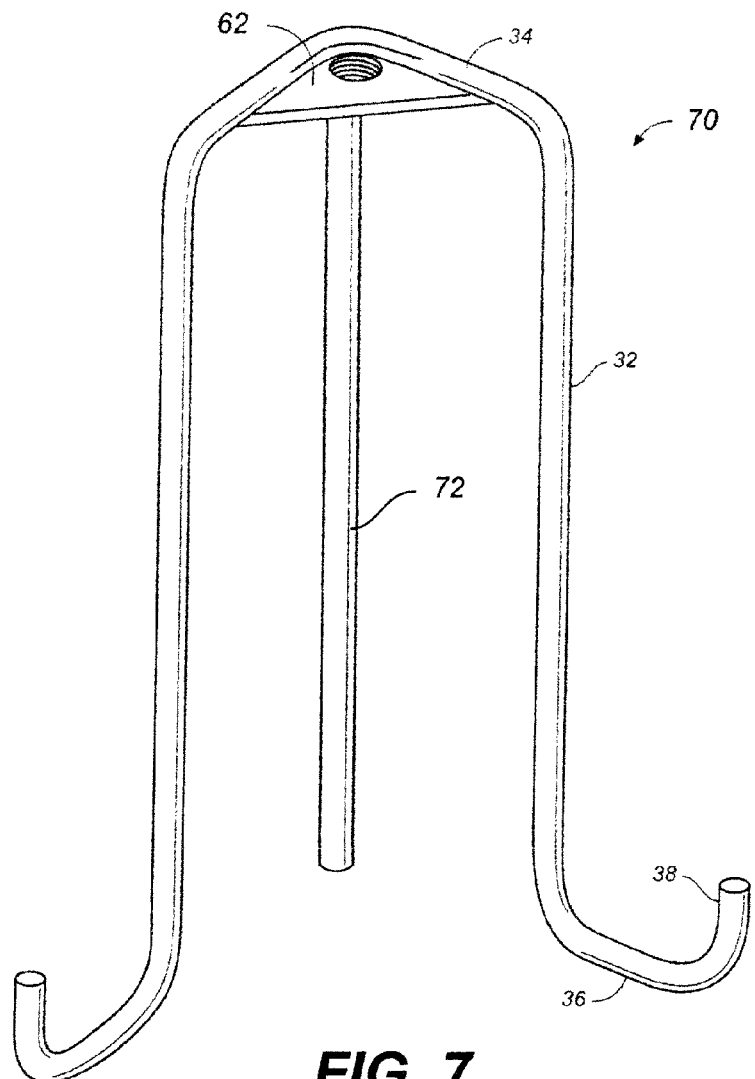
FIG. 7 is a perspective view of a bracket according to still another embodiment of the invention.

FIG. 7 illustrates another embodiment of a bracket 70. In the illustrated embodiment the bracket 70 includes a third leg 72 that defines a longitudinal axis parallel to the bore axis and to the other two longitudinal axes defined by the other two legs 32. The third leg 72 is also attached to the fastening piece 40, for instance, by a weld. Together, the three legs 32, 72 provide a tripod for stability during the installation process. The third leg 72 can terminate as shown, or can also include a foot 36 for still further stabilization.

Figure 8:
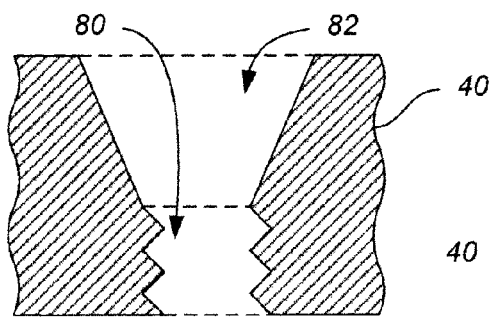
FIGS. 8-10 are cross-sectional views of several alternative embodiments for aligning a conical bore with a threaded bore to help guide a bolt into the threaded bore.
Figure 9:
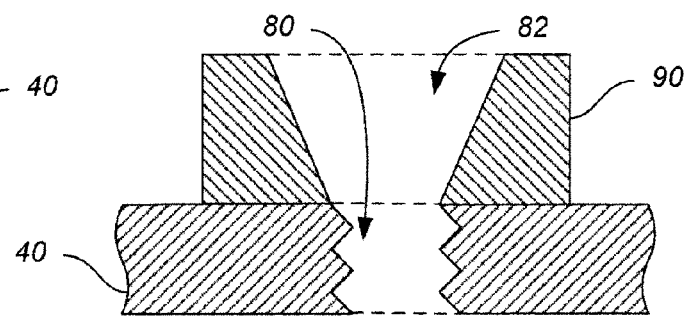
Figure 10:
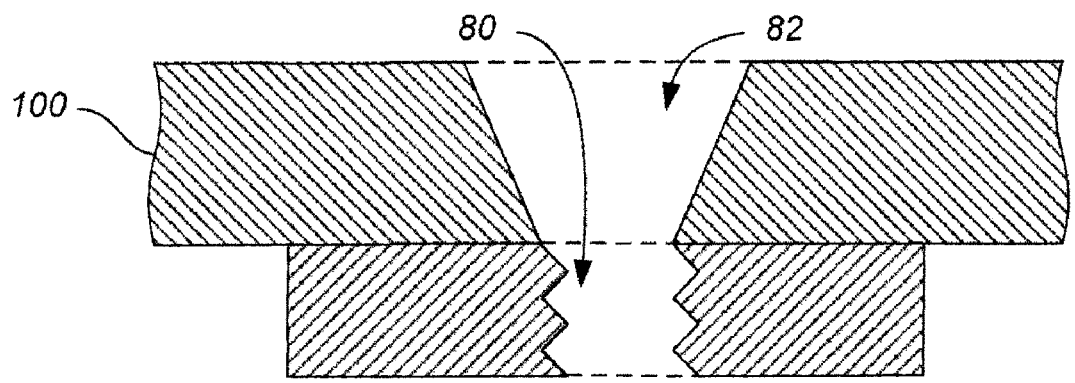

FIGS. 8-10 show cross-sectional views of several alternative embodiments for aligning a conical bore with the bore axis to help guide a bolt into the threaded bore. In FIG. 8, the fastening piece 40 includes both the threaded bore 80 and a conical bore 82 disposed above the threaded bore 80. In FIG. 9, the fastening piece 40 includes the threaded bore 80, and attached above the fastening piece 40 is a guide piece 90 that comprises the conical bore 82. In FIG. 10 the fastening piece 40 including the threaded bore 80 comprises a nut, such as in FIGS. 1-3. The nut is attached below a plate 100 that includes the conical bore 82. In these embodiments, the fastening piece 40 is attached to the legs 32 by the plate 100, as in FIGS. 6 and 7.

Figure 11:
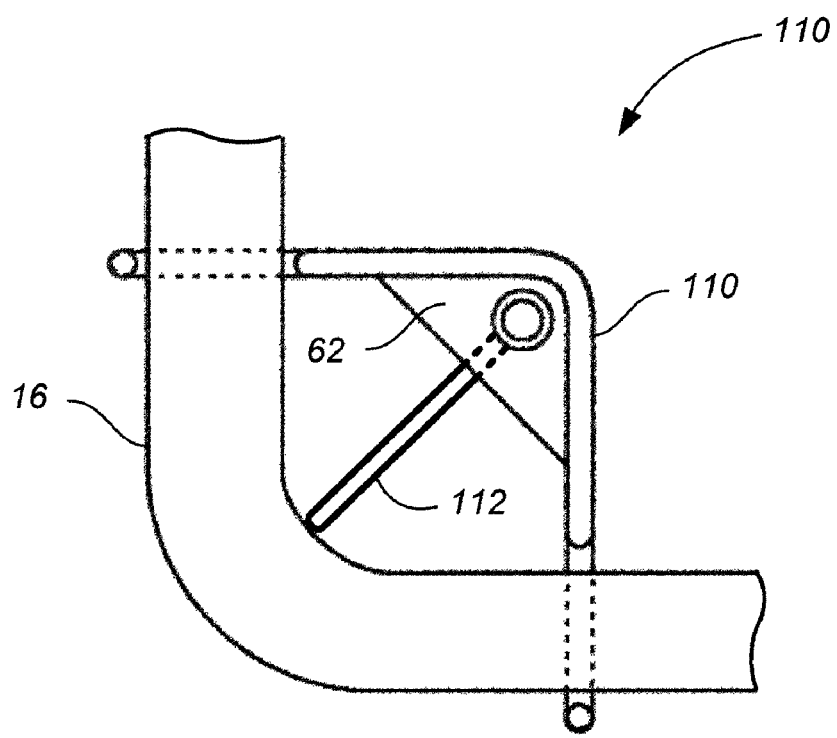
FIG. 11 shows a top view of a bracket, according to yet another embodiment of the invention, engaged with a sidewall of a utility box.

FIG. 11 shows a top view of a bracket 110 engaged with a sidewall 16. The bracket 110 includes a spacer 112 to prevent the free-standing bracket 110 from tilting towards the sidewall 16 during the installation process. In some embodiments, the spacer 112 comprises a rod extending horizontally from the fastening piece 40, which in the illustrated example comprises plate 62.

Figure 13:
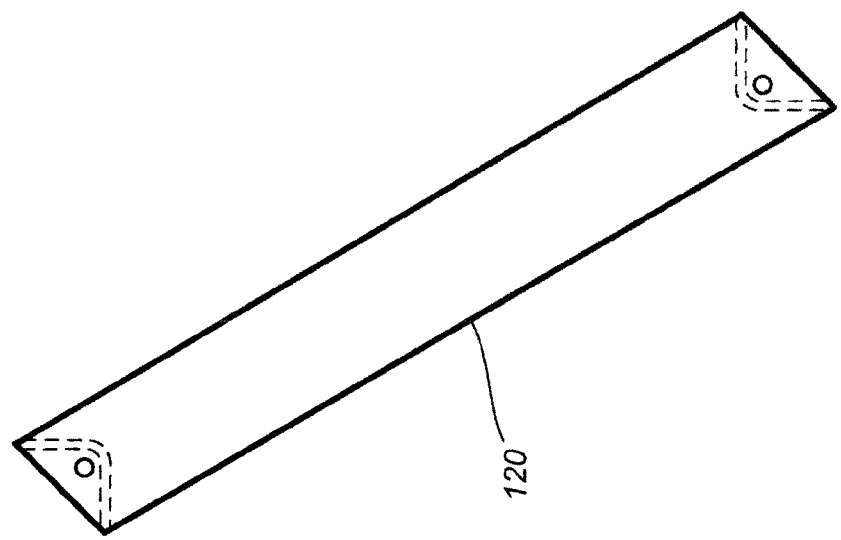
FIG. 13 shows the underside of the stabilization bar shown in FIG. 12, according to an embodiment of the invention.
Figure 12:
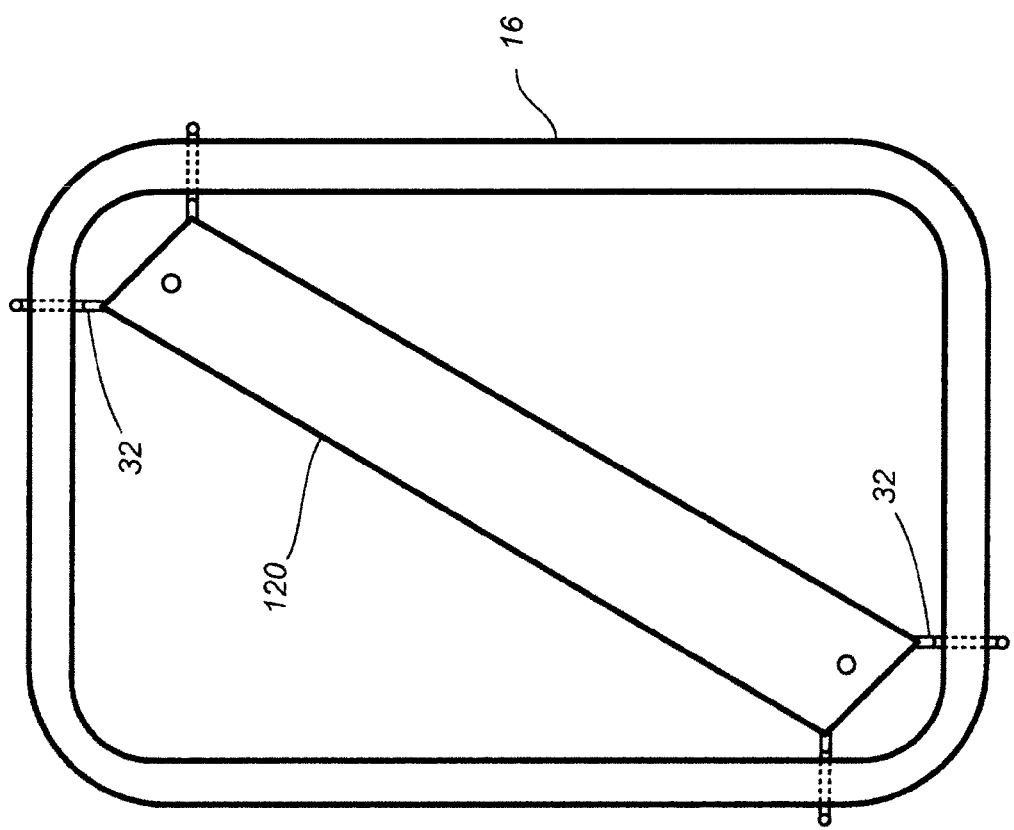
FIG. 12 shows a top view of a sidewall of a utility box engaged with two brackets that are joined by a stabilization bar according to an embodiment of the invention.

FIG. 12 shows a top view of a sidewall 16 with two brackets, such as brackets 30, disposed at diagonal corners of the sidewall 16. A stabilization bar 120 joins the two brackets 30 to keep both brackets 30 positioned during the installation process. An underside of the stabilization bar 120, shown in FIG. 13, is configured to engage the two brackets 30, for example, by including matching grooves 130. The topside of the stabilization bar 120 can also comprise a conical bore similar to the embodiment shown in FIG. 10.

In use, the brackets 30 are engaged under the sidewall 16 and then the stabilization bar 120 is placed over the two brackets. Next, the cover 14 is set into the sidewall 16 and bolts 24 are disposed through holes 22 and through holes in the stabilization bar 120 to engage the fastening piece 40 (not shown). Putty or double-sided tape can be used to improve the engagement of the stabilization bar 120 to the two brackets 30. The stabilization bar 120 is readily removed after the cover 14 is removed to gain access to the interior of the enclosure.

The anti-theft devices of the invention can be installed at the same time as the utility box, in some instances. In other instances, existing utility boxes can be retrofitted to include the anti-theft devices. One method for retrofitting a utility pull box 10 set into the ground is to remove material (e.g., dirt or gravel) from beneath the bottom surface 18 in those locations where the feet 36 of the brackets are intended to extend beneath the bottom surface 18. Alternatively, or in addition, a portion of the sidewall 16 can be partially removed to provide sufficient clearance to insert a foot 36 under the sidewall 16. For instance, a small piece of the sidewall 16 can be chipped away to create a recess in the sidewall 16 to receive the foot 36.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A utility box anti-theft device comprising:
    a fastening piece including a threaded bore defining a bore axis;
    a first leg defining a first longitudinal axis parallel to the bore axis, the first leg including
        a top end attached to the fastening piece, and
        a first foot extending perpendicular to the first longitudinal axis from a bottom end thereof, the first leg and the first foot comprising a first metal rod having a right-angle bend; and
    a second leg defining a second longitudinal axis also parallel to the bore axis, the second leg including
        a top end attached to the fastening piece, and
        a second foot extending perpendicular to the second longitudinal axis from a bottom end thereof and also disposed perpendicular to the first foot.

2. The utility box anti-theft device of claim 1 wherein the fastening piece comprises a nut.

3. The utility box anti-theft device of claim 1 wherein the fastening piece comprises a plate.

4. The utility box anti-theft device of claim 1 wherein the second leg and the second foot comprise a second metal rod having a right-angle bend.

5. The utility box anti-theft device of claim 4 wherein the first and second metal rods are integral.

6. The utility box anti-theft device of claim 5 wherein each leg further includes a cross member comprising the top end attached to the fastening piece.

7. The utility box anti-theft device of claim 1 wherein the first foot defines a horizontal axis and the first foot includes
    a first end attached to the first leg, and
    a toe extending from a second end of the first foot, the toe extending perpendicular to the horizontal axis.

8. The utility box anti-theft device of claim 7 wherein the toe also extends parallel to the first longitudinal axis.

9. The utility box anti-theft device of claim 7 wherein a length of the first foot between the toe and the first leg exceeds the width of a sidewall of a utility pull box.

10. The utility box anti-theft device of claim 1 further comprising a bolt configured to engage the threaded bore of the fastening piece, wherein the bolt includes a non-standard head.

11. The utility box anti-theft device of claim 10 wherein the non-standard head includes a recess to receive a key, the recess including a central pin.

12. The utility box anti-theft device of claim 1 further comprising a third leg attached to the fastening piece and defining a third longitudinal axis also parallel to the bore axis.

13. The utility box anti-theft device of claim 1 further comprising a ground plate attached beneath the feet of the first and second legs.

14. The utility box anti-theft device of claim 1 further comprising a conical bore disposed above the threaded bore and aligned with the bore axis.

15. The utility box anti-theft device of claim 1 further comprising a spacer extending horizontally from the fastening piece.

16. A utility box comprising:
    a sidewall defining an enclosure having opposing top and bottom openings at either end, the sidewall including
        an inner surface,
        opposing top and bottom surfaces, and
        an inner lip disposed within the enclosure and recessed below the top surface;
    a cover disposed within the top opening and supported by the inner lip, the cover including a hole disposed through a thickness thereof and disposed proximate to a corner thereof;
    a bracket engaged beneath the sidewall and including
        a fastening piece having a threaded bore defining a bore axis,
        a first leg defining a first longitudinal axis parallel to the bore axis, the first leg including a top end attached to the fastening piece, and a first foot extending perpendicular to the first longitudinal axis from a bottom end thereof and disposed proximate to the bottom surface of the sidewall, wherein the sidewall is engaged by the first foot, and
        a second leg defining a second longitudinal axis parallel to the bore axis, the second leg including a top end attached to the fastening piece, and a second foot extending perpendicular to the second longitudinal axis from a bottom end thereof and also disposed perpendicular to the first foot; and
    a bolt disposed through the hole in the cover and engaging the threaded bore.

17. The utility box of claim 16 wherein the fastening piece comprises a nut, including the threaded bore, attached to a plate having an aperture aligned with the threaded bore.

18. The utility box of claim 17 wherein the aperture through the plate comprises a conical bore.

* * * * *